(12) United States Patent
Brennan et al.

(10) Patent No.: US 12,182,396 B2
(45) Date of Patent: Dec. 31, 2024

(54) PERFORMANCE AND MEMORY ACCESS TRACKING

(71) Applicants: Advanced Micro Devices, Inc., Santa Clara, CA (US); ATI Technologies ULC, Markham (CA)

(72) Inventors: Christopher J. Brennan, Boxborough, MA (US); Akshay Lahiry, Boxborough, MA (US); Guennadi Riguer, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 18/192,694

(22) Filed: Mar. 30, 2023

(65) Prior Publication Data

US 2024/0329833 A1    Oct. 3, 2024

(51) Int. Cl.
*G06F 3/06* (2006.01)
(52) U.S. Cl.
CPC .......... *G06F 3/0604* (2013.01); *G06F 3/0655* (2013.01); *G06F 3/0673* (2013.01)
(58) Field of Classification Search
None
See application file for complete search history.

(56) References Cited

U.S. PATENT DOCUMENTS

| | | | | |
|---|---|---|---|---|
| 6,732,124 | B1* | 5/2004 | Koseki | G06F 12/0868 |
| | | | | 711/119 |
| 2012/0303910 | A1 | 11/2012 | Ma | |
| 2015/0134926 | A1* | 5/2015 | Yang | G06F 3/0652 |
| | | | | 711/167 |
| 2016/0301753 | A1* | 10/2016 | Auch | G06F 15/167 |
| 2018/0004428 | A1* | 1/2018 | Seong | G06F 3/0688 |
| 2020/0089559 | A1 | 3/2020 | Ainsworth et al. | |
| 2020/0411127 | A1 | 12/2020 | Vigilante et al. | |
| 2021/0374037 | A1 | 12/2021 | Grimwood et al. | |
| 2024/0037031 | A1* | 2/2024 | Brennan | G06F 11/3409 |

FOREIGN PATENT DOCUMENTS

CN     114417395 B    8/2022

* cited by examiner

*Primary Examiner* — Kevin Verbrugge
(74) *Attorney, Agent, or Firm* — Volpe Koenig

(57) ABSTRACT

Techniques for performing memory operations are disclosed herein. The techniques include generating a plurality of performance log entries based on observed operations; generating a plurality of memory access log entries based on the observed operations, wherein each performance log entry of the plurality of performance log entries are associated with one or more memory access log entries of the plurality of memory access log entries, wherein each performance log entry is associated with an epoch; and wherein each memory access log entry is associated with an epoch and a memory address range.

20 Claims, 4 Drawing Sheets

PERFORMANCE AND MEMORY ACCESS TRACKING

BACKGROUND

Computation performance depends in part on memory performance. Improving computation performance can thus be achieved by optimizing memory accesses. Further, increasingly specific insight into memory access performance can, at least theoretically, provide an increasing ability to improve performance. However, attempting to obtain such specific insight can, itself, impact performance, which can skew measurements, resulting in inaccurate measurement results. Improvements in performance profiling are constantly being made.

BRIEF DESCRIPTION OF THE DRAWINGS

A more detailed understanding can be had from the following description, given by way of example in conjunction with the accompanying drawings wherein.

DETAILED DESCRIPTION

Techniques for performing profiling operations are disclosed herein. The techniques include generating a plurality of performance log entries based on observed operations; generating a plurality of memory access log entries based on the observed operations, wherein each performance log entry of the plurality of performance log entries are associated with one or more memory access log entries of the plurality of memory access log entries, wherein each performance log entry is associated with an epoch; and wherein each memory access log entry is associated with an epoch and a memory address range.

Figure 1:
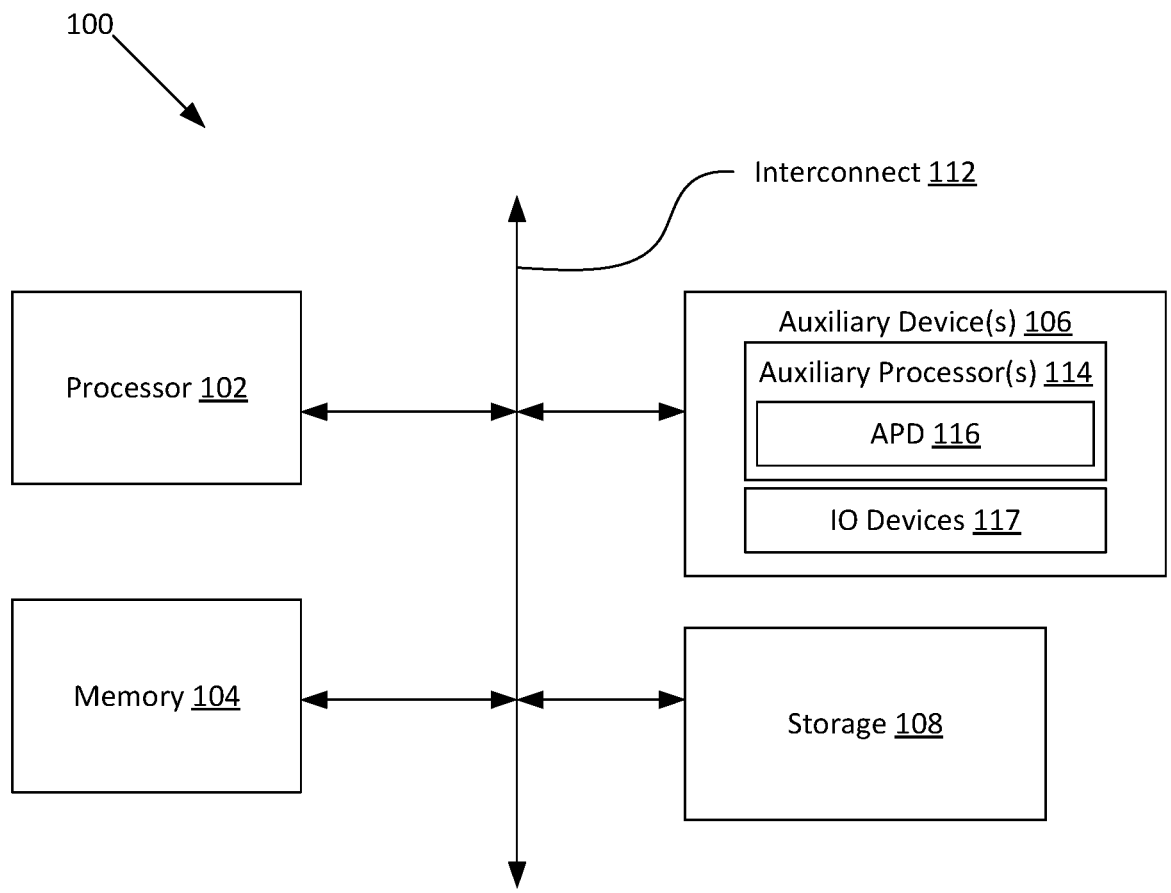
FIG. 1 is a block diagram of an example device in which one or more features of the disclosure can be implemented.

FIG. 1 is a block diagram of an example computing device 100 in which one or more features of the disclosure can be implemented. In various examples, the computing device 100 is one of, but is not limited to, for example, a computer, a gaming device, a handheld device, a set-top box, a television, a mobile phone, a tablet computer, or other computing device. The device 100 includes, without limitation, one or more processors 102, a memory 104, one or more auxiliary devices 106, and a storage 108. An interconnect 112, which can be a bus, a combination of buses, and/or any other communication component, communicatively links the one or more processors 102, the memory 104, the one or more auxiliary devices 106, and the storage 108.

In various alternatives, the one or more processors 102 include a central processing unit (CPU), a graphics processing unit (GPU), a CPU and GPU located on the same die, or one or more processor cores, wherein each processor core can be a CPU, a GPU, or a neural processor. In various alternatives, at least part of the memory 104 is located on the same die as one or more of the one or more processors 102, such as on the same chip or in an interposer arrangement, and/or at least part of the memory 104 is located separately from the one or more processors 102. The memory 104 includes a volatile or non-volatile memory, for example, random access memory (RAM), dynamic RAM, or a cache.

The storage 108 includes a fixed or removable storage, for example, without limitation, a hard disk drive, a solid state drive, an optical disk, or a flash drive. The one or more auxiliary devices 106 include, without limitation, one or more auxiliary processors 114, and/or one or more input/output ("IO") devices. The auxiliary processors 114 include, without limitation, a processing unit capable of executing instructions, such as a central processing unit, graphics processing unit, parallel processing unit capable of performing compute shader operations in a single-instruction-multiple-data form, multimedia accelerators such as video encoding or decoding accelerators, or any other processor. Any auxiliary processor 114 is implementable as a programmable processor that executes instructions, a fixed function processor that processes data according to fixed hardware circuitry, a combination thereof, or any other type of processor.

The one or more auxiliary devices 106 includes an accelerated processing device ("APD") 116. The APD 116 may be coupled to a display device, which, in some examples, is a physical display device or a simulated device that uses a remote display protocol to show output. The APD 116 is configured to accept compute commands and/or graphics rendering commands from processor 102, to process those compute and graphics rendering commands, and, in some implementations, to provide pixel output to a display device for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and, optionally, configured to provide graphical output to a display device. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

The one or more IO devices 117 include one or more input devices, such as a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals), and/or one or more output devices such as a display device, a speaker, a printer, a haptic feedback device, one or more lights, an antenna, or a network connection (e.g., a wireless local area network card for transmission and/or reception of wireless IEEE 802 signals).

Figure 2:
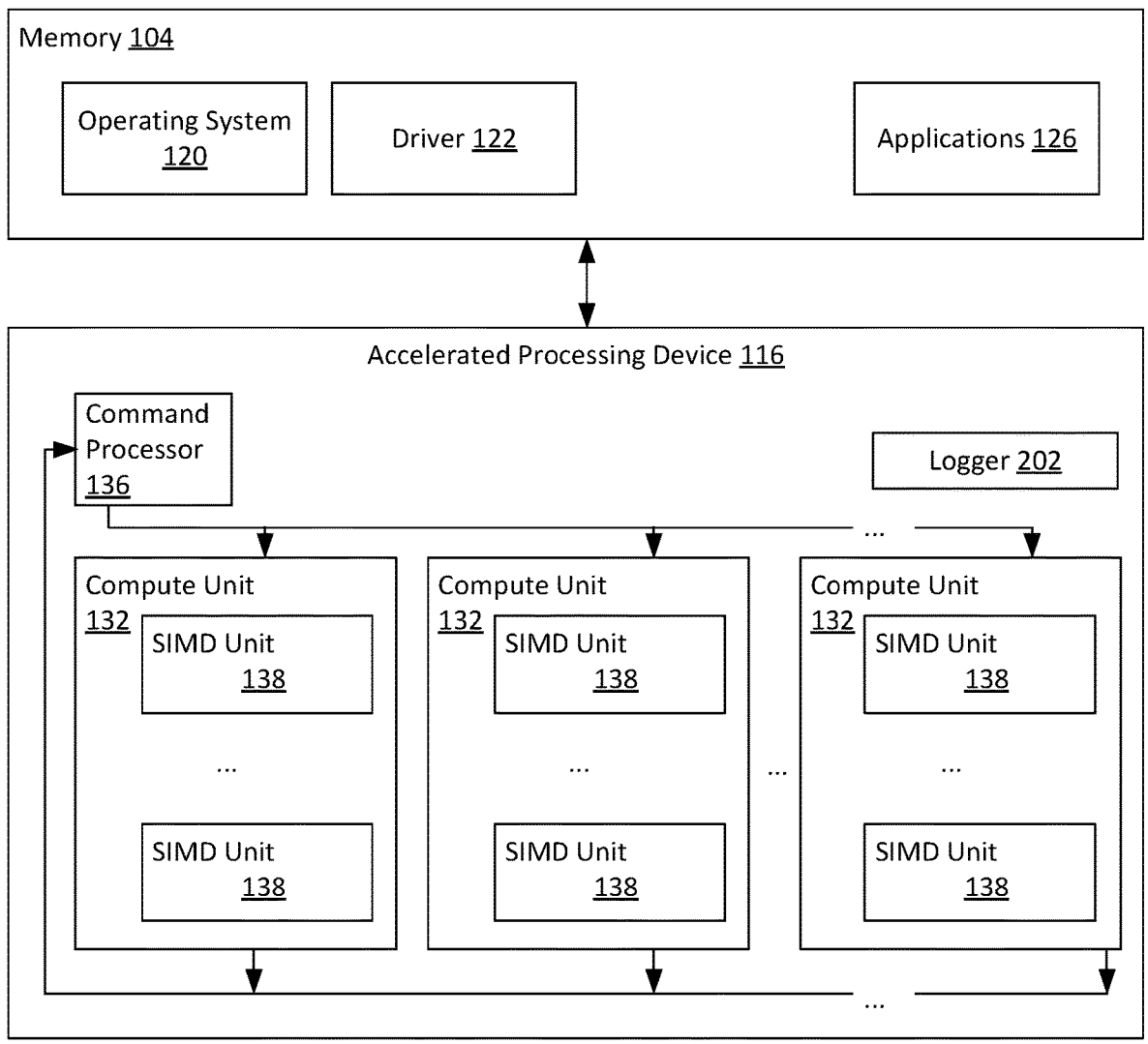
FIG. 2 illustrates details of the device of FIG. 1, according to an example.

FIG. 2 illustrates details of the device 100 and the APD 116, according to an example. The processor 102 (FIG. 1) executes an operating system 120, a driver 122 ("APD driver 122"), and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to a display device based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 (also referred to sometimes herein as a "command processor 136") is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

It is desirable to understand what memory accesses are occurring at a fine-grained level and in real time. Computer systems often provide some degree of visibility into what memory accesses are occurring and when. However, such visibility is usually limited, such as by providing only an overall count of memory accesses during a long time period. Fine-grained access information, indicating which addresses memory accesses are directed to, and what times such memory accesses are made, are usually not provided by the hardware. Such information can be very useful. For example, fine-grained memory access information can allow an application developer to identify memory access bottlenecks in an application at a very fine-grained level (e.g., to understand which accesses, made at which times, are problematic), which can allow the application developer to improve application performance by adjusting aspects of operation such as ordering of memory accesses, grouping of memory accesses, or the like. In another example, fine-grained memory access information can be provided to a runtime performance analyzer that can adjust execution settings based on the memory accesses.

A logger 202 is illustrated in FIG. 2. Although illustrated as part of the APD 116, it should be understood that, in alternative examples, the logger 202 is not part of the APD 116 and is communicatively coupled to the APD 116. The logger 202 is configured to store performance event information into a performance log and to store memory access event information into a memory access log. The memory access events include events such as writes to memory and reads from memory. The memory access event information indicates, either implicitly or explicitly, memory addresses associated with the memory accesses. In other words, the memory access logs store indications of what memory accesses are performed as well as what memory addresses the memory accesses are directed to. The memory address information is provided at a certain level of granularity that is not necessarily the exact address. In some examples, the memory address specifies a large chunk of memory—a memory address range—in which the memory accesses are performed, but does not provide more specific information than that. Both the performance event information and the memory access event information include or are associated with time periods or other ordering information that indicates the "time" for the associated performance events or memory access events. In some instances herein, this "time" is referred to as an epoch. In addition, the performance event information for a certain time includes memory access event references that point to associated memory access event information for that same time. These memory access event references allow correlation of performance events with memory access events, for example, during subsequent analysis or use of the performance event information and memory access event information.

As stated above, the performance event information for a certain time period includes references to memory access event information for the same time period. These references allow subsequent processing to correlate performance events with memory accesses. Performance events may indicate a variety of aspects of performance, such as processing throughput, processing latency, memory access performance (e.g., amount of data successfully accessed in a given amount of time), or other aspects. In general, the performance events indicate how well the computing device 100 is performing in a given time period, and any of a variety of measures for such performance may be used. Associating such performance events with memory access events allows subsequent analysis to first detect a performance level of interest (e.g., a drop in performance) and then to determine which memory accesses occur at that time period, and which addresses are associated with such memory accesses. In some examples, this determination allows the analysis to determine that the way in which certain memory accesses that are performed results in a particular drop in performance, or more generally to determine that some aspect of the memory accesses themselves or of processing related to the memory accesses results in, results from, or is otherwise associated with a particular drop in performance.

The logger 202 is capable of recording which memory addresses the various memory accesses are targeting. In some examples, the address resolution for which such tracking occurs is variable by the logger 202, either automatically or at the request of a different unit. The address resolution refers to the size of the memory access range for which the logger 202 stores individual items of memory access information. For example, with a 256 byte address resolution, the logger 202 stores items of memory access information for accesses within 256 byte address ranges. In an example, for a first "time," the logger 202 detects memory accesses to addresses within a first 256 byte range and records such memory accesses as the memory access event information for the first time and for the first 256 bytes. The logger 202 thus stores information indicating that the detected number of memory accesses has occurred during the first time. No information is stored indicating which memory addresses within that 256 byte range the memory accesses occurred to. As can be seen, the address resolution indicates the specificity with which memory access events are recorded.

The logger 202 records performance events on a per time basis and records memory access events on a per time basis as well. In some examples, the logger 202 records a single performance event entry for a given time and records multiple memory access event entries for a given time. Each performance event entry stores performance event information for a particular time. Each memory access event entry stores memory access event information for a particular combination of time and memory address range. In other words, in such examples, the logger 202 stores, for each time, one item of performance event information and multiple items of memory access event information, where each item of memory access event information is for a different memory address range. Each item of performance event information includes a set of performance events for a time and for multiple memory address ranges and each item of memory access event information is associated with a time and a memory address range and includes indications of which memory accesses to that memory address range occur in the associated time. It should be understood that performance event information is not specific to any memory address range and thus covers multiple memory address ranges (or can be considered to cover the entire memory address space).

In some examples, the memory addresses tracked by the logger 202 are in a physical address space, as opposed to a virtual address space. A physical address space is the address space of the physical memory devices, whereas a virtual address space is the address space that is mapped to the physical address space and is thus independent from the physical addresses of the memory devices. Typically, an operating system and/or hardware (e.g., a memory controller) maintains information mapping virtual address spaces to physical address spaces. When applications or other software or hardware requests access to memory using a virtual address, the operating system and/or hardware translates such virtual addresses to physical addresses to access the memory.

The address range size for the memory access event information tracked by the logger 202 may or may not be the same as the virtual address memory page size. A virtual address memory page is a portion of contiguous addresses for which a memory address translation occurs. More specifically, typically, a virtual address has a portion (typically the most significant bits) that is considered the virtual memory page address. It is this portion that is translated to a physical address memory page. Obtaining a finer granularity physical address occurs by translating the virtual memory page address to a physical memory page address and then adding an offset. The offset is a portion of the virtual memory address other than the virtual memory page address. The size of the address range may be different from or the same as this virtual memory page size.

In some examples, it is advantageous to have the tracking address range size be smaller than or equal to the virtual memory page size. This is because if the tracking address range size were larger than the virtual memory page size, then it would be possible to track in any particular item of memory access event information, information from multiple unrelated virtual memory pages, which may not be desirable. That is, tracking information from multiple unrelated virtual memory pages could result in an inability to discriminate between virtual memory pages for the aggregate states tracked in a single item of memory address tracking information. Thus, in some examples, the logger 202 limits the memory address range size to equal to or smaller than the virtual memory address page size.

Above, it is stated that performance information and memory access event information is tracked for particular "times." The term "time" is defined broadly herein. Time does not necessarily refer to wall clock time or to chip clock time or some other similar measure, although in some examples, time does refer to one such measure. Alternatively, it is possible for "time" to be measured by relation to number of tracked events occurring. In an example, "time" advances when an event that is tracked occurs. For example, when a memory access occurs, time is incremented. In another example, time is advanced for each byte of memory that is accessed over a data fabric (connection between requestor and memory) or for each byte accessed in a memory. In yet another example, time is advanced where a reference clock is advanced. Thus, in this example, in any particular item of memory access event information, a certain number of memory access events is stored. In other words, in some examples, the logger 202 tracks a certain number of events. In another example, in any particular item of performance event information, a certain number of performance events is stored.

In some examples, each item of performance event information and each item of memory access event information corresponds to an "epoch." Each epoch ends when an epoch end event occurs. In some examples, an epoch end event occurs when an item of performance event information overflows or when an item of memory access event information overflows. In some examples, an overflow occurs when the storage available in an item of performance event information or in an item of memory access event information overflows. In some examples, an overflow occurs when sufficient data has been tracked such that the amount of storage available is zero or is insufficient to store more data, for at least one item of tracked data—in other words, where there is no space left in the storage to store additional data. In some examples, the storage that overflows can track any type of information. It should be understood that this storage is the storage that stores any of the data tracked by the logger. In some examples, storage overflows when a number of performance events or memory access events is equal to a maximum for any item in a given epoch. In other examples, storage overflows when a count for statistic information for an item of performance event information or for an item of memory access event information reaches a maximum value (e.g., for an 8-bit counter, reaches 255). In some examples, when an overflow occurs, a new epoch, with new items of performance event information and memory access information, is started. It should be understood that an item of memory access event information for a given address range in a given epoch can overflow before any other item of memory access event information for a different address range in the same epoch overflows. In that instance, a new epoch is started, both for the performance event information and for all items of memory access event information. In some examples, each item of performance event information includes one or more pointers to one or more items (or all items) of memory access event information in the same epoch as the item of performance event information. In some examples, a new epoch is not started and a new item of performance event information is created in the same epoch.

Figure 3:
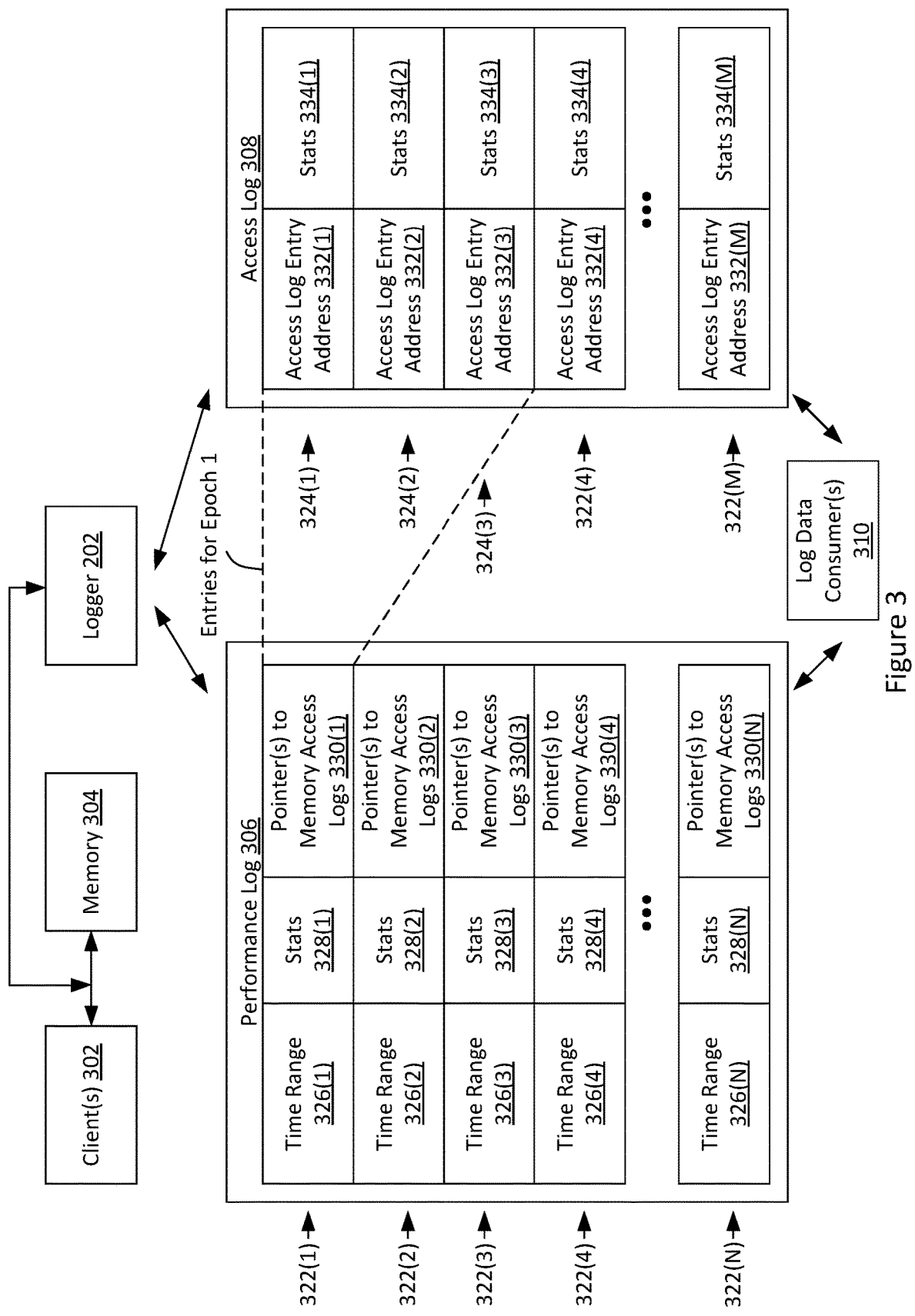
FIG. 3 illustrates example operations for a logger.

FIG. 3 illustrates example operations performed by the logger 202. The logger 202 interfaces with one or more clients 302 and one or more memories 304. Specifically, the logger 202 monitors performance events for the client(s) 302 and memory 304, monitors memory accesses from the clients 302 to the memory 304, and records such events in the performance log 306 and access log 308. It should be understood that the memory 304 is any technically feasible memory, such as a cache or a memory, and such as a memory on the same chip as or on a different chip as the logger 202, the processor 102, or the APD 116. In some examples, a logger 202 exists for multiple memory elements of a memory hierarchy (i.e., for each cache, each memory, and the like). In some examples, a logger 202 tracks events for multiple memories (e.g., for one or more caches and/or for one or more memories or other entities). In some such examples, each memory access log entry stores stats for multiple memories/caches. In other such examples, each memory access log entry is devoted to a single memory or cache type and each such memory access log entry includes an indication of the associated memory type.

In some examples, the clients 302 are any unit of the device 100 that are capable of making memory access requests. In some examples, such units include the processor 102 and the APD 116, as well as any other unit capable of making memory access requests, such as an auxiliary processor 114 or IO device 17. In various examples, the logger 202 is embodied as hardware (e.g., circuitry configured to perform operations described herein), software executing on a processor, or a combination thereof. In some examples, the logger 202 is partially or fully implemented by the command processor 136. In some examples, the command processor 136 is a programmable processor that executes software that performs some or all of the functionality of the logger 202.

As the logger 202 monitors the performance events and memory access events, the logger 202 generates performance log entries 322 and memory access log entries 324. In some examples, the performance log entries 322 are the items of performance event information discussed above. In some examples, the memory access log entries 324 are the items of memory access event information described above. The logger 202 observes performance events and memory access events, extracts or generates information about such events, and writes such information into the performance log entries 322 and memory access log entries 324 as described elsewhere herein.

Each performance log entry 322 includes a time range 326, statistics 328, and one or more pointers to memory access logs 330. In some examples, the time range includes an indication of a reference clock that measures actual time (e.g., wall clock time) or that measures system clock time (e.g., number of cycles since an initial point) or that is based on system clock time for any clock of the device 100. Note that this time range 326 is not necessarily the same type of time as the time that defines which "epoch" an entry is within, as the epoch may be based on the ordering of performance events or memory access events. Storing the time range 326 explicitly in the performance log entry 322 provides the ability to link a particular epoch to an actual point in time.

The statistics 328 include information about the performance events that are tracked. Some example statistic information is for the given epoch (e.g., occurs within that epoch) and includes: the number of data fabric bytes written or read, for one or more memory types (e.g., cache, memory, or other memory type), the number of bytes written to, read from, and/or prefetched into each such memory type, the number of read instances and number of bytes involved in a compression read/modify/write operation, a number of compression metadata bytes read from or written to a memory, the number of burst writes or reads, the amount (e.g., percentage) of bandwidth used for one or more of memory, cache, or data fabric, power management events, and user-defined events which are definable by an entity such as software. Performance log entries 322 include one or more of these items of statistic information.

The number of data fabric bytes written or read includes the number of bytes written or read using a data fabric. A data fabric is the connection between clients 302 and memory 304. Data fabrics can have a capacity (e.g., bandwidth) independent of that of the memories or clients for which the data is written or read, and thus the ability to measure the number of bytes written or read can be useful to understand. The number of bytes read or written for one or more memory types is stored on a per memory type basis. In an example a number of bytes that are read from or written to a cache in an epoch is stored in the statistics for a particular entry 322 and the number of bytes that are read from or written to a memory in the same epoch is also stored in the statistics for that entry 322. In some examples, memory accesses are accessed to compressed data, where compression is a hardware supported operation. In some such examples, the logger 202 separately maintains the number of bytes read, written, or modified for compressed data and for uncompressed data. Thus, in some such examples, the statistics 328 for a particular entry 322 include a number of bytes read, written, or modified for uncompressed data within an epoch, and a number of bytes read, written, or modified for compressed data within the same epoch. In addition, compressed data can include or require additional metadata that specifies information required for compressing or decompressing the data or that is otherwise useful to the compression operation. In some examples, the statistics 328 store the amount of such metadata that is stored in the epoch. In some examples, memory accesses are of a burst type and a non-burst type. Generally, burst type accesses are accesses to relatively large amounts of data that is contiguous in the physical address space, whereas non-burst type accesses are accesses to individual items of data (e.g., individual words). In some examples, the statistics 328 separately store a count of burst-type accesses, in addition to a count of non-burst type accesses. The bandwidth information includes the percent (or other measure) of bandwidth capacity actually used for a memory or data fabric within the mentioned epoch.

For any given performance log entry 322 for a particular epoch, the pointers to access logs 330 include pointers to the access log entries 324 for that epoch. In some examples, a single performance log entry 322 for an epoch includes pointers to all access log entries 324 in the access log 308 for that same epoch. Each access log entry 324 includes an access log entry address 332 and access log statistics 334. The access log entry address 332 for an access log entry 324 specifies the address range of the statistics 334 for that access log entry 324. More specifically, the entire access log 308 has an address range size (the "address resolution" described above) which specifies the granularity with which memory accesses are tracked. This address range size also indicates the range of memory addresses after the access log entry address 332 that is tracked by an access log entry 324. In other words, each access log entry 324 tracks addresses between the access log entry address 332 and the access log entry address 332 added to the address range size. The stats 334 include information about the memory accesses tracked within the corresponding address range specified by the access log entry 332. It should be seen that a performance log entry 322 for an epoch includes statistics 328 about multiple different address ranges that occur within an epoch, and each such address range has a different access log entry 324, each of which includes statistics 334 about the memory accesses made to the address range within the epoch.

The statistics 334 include any combination of the following, all for the epoch and the memory address range of the access log entry 324: the number of bytes returned over the data fabric, the number of bytes written over the data fabric, the read compression ratio, the write compression ratio, the number of bytes written to or read from a memory (which such number can be stored independently for different types of memories, such as memory, caches, or other types of memories), the number of bytes prefetched into a memory, the number of bytes rinsed (where rinsing means writing dirty data back to a backing memory so that the data is no longer dirty), the number of reads caused by compression operations, the number of atomic memory operations performed, the cache policy (including, for example, whether allocations are allowed into the cache, where allocations occur when a miss occurs, in order to store missed data into the cache, re-reference interval prediction data, which indicates the amount of "time" between re-references of a cache line), user-defined data, or any other type of information that could be stored. The read compression ratio is the ratio of the size of compressed data to the size of uncompressed data for read operations and the write compression ratio is the ratio of the size of compressed data to the size of uncompressed data for write operations. The number of reads caused by compression operations includes how many reads to data actually occur due to a compression operation. For example, reading from compressed data or writing compressed data may require reading or writing of data other than the actual data compressed, and this other data can include compression metadata or other data of a compressed block (since data may be compressed together and thus operation on one portion of compressed data may require other operations on other data that is compressed together).

Log data consumers 310 are illustrated in FIG. 3 as well. These log data consumers 310 include one or more of a log data backup agent and/or a log data analyzer, either of which is embodied as hardware (e.g., circuitry), software executing on a processor, or a combination thereof. A log data backup agent stores the information from the performance log 306 and/or the access log 308 into one or more backup memories. In some examples, this storing does not, itself, trigger any logging. The one or more backup memories include one or more of the memory 104, memories within the APD 116, storage 108, or other memories. The log data backup agent transfers the data from the performance log 306 and/or access log 308 when either of those logs run out of room (e.g., when a new entry is to be created but there is no space left), or in response to any other technically feasible event. The log data analyzer analyzes the performance log 306 and/or access log 308. In some examples, the log data analyzer analyzes these logs to determine how to adjust the operation of the device 100 for better performance, and/or analyzes these logs to generate and provide conditioned information for consumption by another system or for a human (e.g., for a human developer developing an application who will use profiling data to improve performance of the application). In some examples, the log data analyzer is embodied as multiple parallel programs (such as compute shader programs executing on the APD 116). The data in the performance log 306 and access log 308 is organized to facilitate efficient parallel processing of such data. In an example, one parallel execution item (e.g., a first compute shader work-item or wavefront) analyzes a first access log entry 324 during a time period in which a second parallel execution item analyzes a second access log entry 324. Both such parallel execution items produce a result for such analysis in parallel, which is used by a different execution item (such as a compute shader work-item or wavefront or even a thread on the processor 102). In some examples, a different parallel execution item analyzes the performance logs 322 in parallel with the first and second parallel execution item as well. In some examples, a parallel execution item analyzes a performance log entry 322, fetches the pointers 330, and spawns further parallel execution items to analyze the access log entries 324 pointed to by the pointers 330, along with information from the analysis of the performance log entries 322. In some examples, a single execution item processes information in or derived from multiple access log entries 324. In some examples, a single execution item processes information from different epochs. In some such examples, the single execution item aggregates information from different epochs, for example, by combining statistics for smaller address ranges and single epochs to generate statistics for larger address ranges and longer epochs.

In some examples, the logger 202 filters information, preventing that information from being written to the performance log 306 and/or the access log 308. In some such examples, the logger 202 references data indicating the processes, virtual machines, or other entities for which logging is allowed and ignores (does not log for) accesses for which logging is not allowed. In an example, an application that has logging disabled makes memory accesses, but the logger 202 does not include information about such memory accesses in the performance log 306 and/or access log 308.

Figure 4:
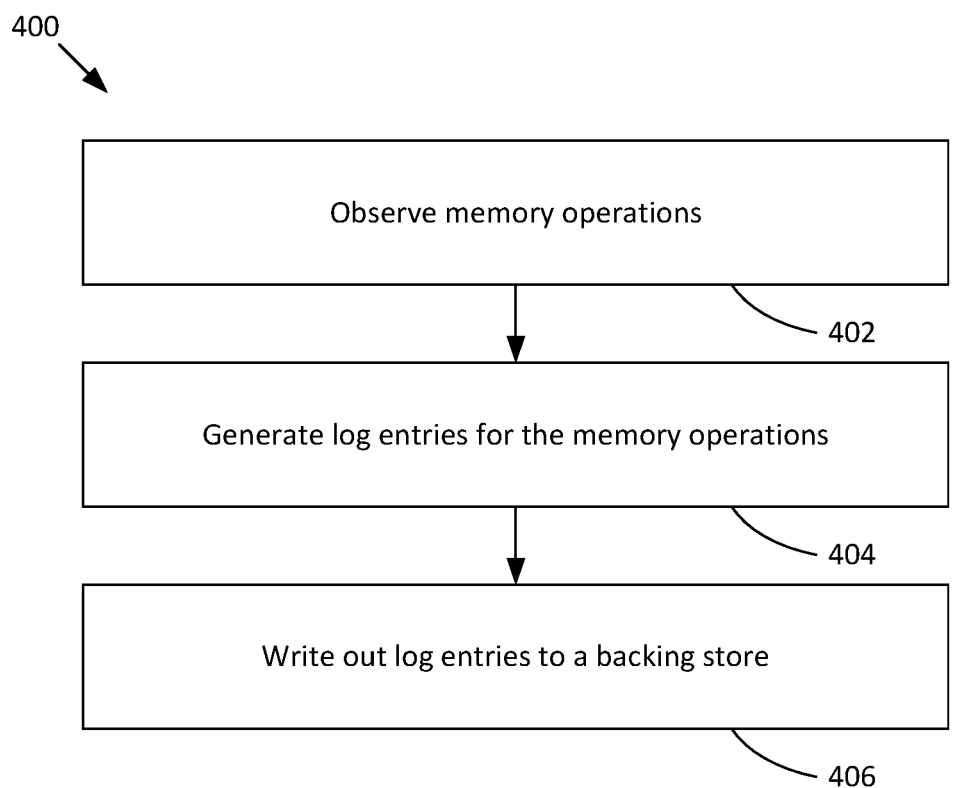
FIG. 4 is a flow diagram of a method for performing memory operations, according to an example.

FIG. 4 is a flow diagram of a method 400 for performing performance-related and memory-related operations, according to an example. Although described with respect to the system of FIGS. 1-3, those of skill in the art will understand that any system, configured to perform the steps of the method 400 in any technically feasible order, falls within the scope of the present disclosure.

At step 402, a logger 202 observes operations for one or more clients 302 and/or one or more memories 304. The operations include one or more of the operations described above with respect to the information that is stored in the performance log 306 and/or the access log 308. At step 404, the logger 202 generates entries for either or both of the performance log 306 and the access log 308 based on the observed operations. In some examples, the logger 202 operates based on epochs. An epoch is a certain amount of "time," where "time" is measured as described herein. An epoch begins after a previous epoch ends and an epoch ends when an epoch end event occurs, as described elsewhere herein. When an epoch end event occurs, the logger 202 generates an entry for the performance log 306 and one or more entries for the access log 308. As described elsewhere herein, a generated performance log entry 322 includes stats 328 for an epoch and pointers to one or more access log entries 324, each of which is associated with a memory address range and includes statistics 334 for that memory address range. At step 406, the logger 202 writes out log entries (e.g., the performance log entries 322 and the memory access log entries 324) to a backing store. In some examples, this operation occurs when new entries are to be placed into a log and insufficient space exists for such entries, or occurs on any technically feasible trigger, such as periodically. One or more log data consumers 310 may process the information from the performance log 306 and access log 308, either in those logs or after such information is written to the backing store. In various examples, the performance log 306 and access log 308 are stored in memories of the logger 202, dedicated to the logger 202, or in memory that is more general and shared with other units (such as general memory of the APD 116). The backing store acts as a larger, overall memory for the log entries, thus providing for memory of such entries even in situations where the performance log 308 and access log 308 have no more capacity for entries.

The various functional units illustrated in the figures and/or described herein (including, but not limited to, the processor 102, the auxiliary devices 106, auxiliary processors 114, the APD 116, the IO devices 117, the scheduler 136, the compute units 132, the SIMD units 138, the logger 202, the clients 302, the memory 304, and the log data consumer(s) 310, may be implemented as a general purpose computer, a processor, a processor core, or fixed function circuitry, as a program, software, or firmware, stored in a non-transitory computer readable medium or in another medium, executable by a general purpose computer, a processor, or a processor core, or as a combination of software executing on a processor or fixed function circuitry. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method comprising:
generating a plurality of performance log entries based on observed operations; and
generating a plurality of memory access log entries based on the observed operations,
wherein each performance log entry of the plurality of performance log entries is associated with one or more memory access log entries of the plurality of memory access log entries,
wherein each performance log entry is associated with an epoch; and
wherein each memory access log entry is associated with an epoch and a memory address range.

2. The method of claim 1, wherein each performance log entry of the performance log entries includes a set of performance statistics.

3. The method of claim 2, wherein the set of performance statistics includes information about how much data is read from or written to memory within an epoch.

4. The method of claim 2, wherein the set of performance statistics includes information about bandwidth utilization for memory or data fabric within an epoch.

5. The method of claim 1, wherein, for a performance log entry associated with an epoch, the performance log entry includes one or more pointers that point to one or more memory access log entries for the epoch.

6. The method of claim 1 further comprising processing multiple memory access log entries of the plurality of performance log entries in parallel by a plurality of compute unit execution items.

7. The method of claim 6, wherein processing the multiple memory access logs in parallel includes analyzing the multiple memory access logs to identify operational changes to improve performance.

8. The method of claim 1, wherein each memory access log entry includes statistics for memory accesses within the memory address range and for the epoch associated with the memory access log entry.

9. The method of claim 1, further comprising storing each memory access log entry and each performance log entry into a backing store.

10. A system, comprising:
a computing system; and
a logger configured to:

generate a plurality of performance log entries based on observed operations; and generate a plurality of memory access log entries based on the observed operations, wherein each performance log entry of the plurality of performance log entries is associated with one or more memory access log entries of the plurality of memory access log entries, wherein each performance log entry is associated with an epoch; and wherein each memory access log entry is associated with an epoch and a memory address range.

11. The system of claim 10, wherein each performance log entry of the performance log entries includes a set of performance statistics.

12. The system of claim 11, wherein the set of performance statistics includes information about how much data is read from or written to memory within an epoch.

13. The system of claim 11, wherein the set of performance statistics includes information about bandwidth utilization for memory or data fabric within an epoch.

14. The system of claim 10, wherein, for a performance log entry associated with an epoch, the performance log entry includes one or more pointers that point to one or more memory access log entries for the epoch.

15. The system of claim 10, further comprising a processor configured to execute a plurality of compute unit execution items that are configured to process multiple memory access log entries of the plurality of performance log entries in parallel.

16. The system of claim 15, wherein processing the multiple memory access logs in parallel includes analyzing the multiple memory access logs to identify operational changes to improve performance.

17. The system of claim 10, wherein each memory access log entry includes statistics for memory accesses within the memory address range and for the epoch associated with the memory access log entry.

18. The system of claim 10, wherein the logger is further configured to store each memory access log entry and each performance log entry into a backing store.

19. A non-transitory computer-readable medium storing information that, when executed by a processor, cause the processor to perform operations comprising:

generating a plurality of performance log entries based on observed operations; and generating a plurality of memory access log entries based on the observed operations, wherein each performance log entry of the plurality of performance log entries is associated with one or more memory access log entries of the plurality of memory access log entries, wherein each performance log entry is associated with an epoch; and wherein each memory access log entry is associated with an epoch and a memory address range.

20. The non-transitory computer-readable medium of claim 19, wherein the operations further comprise storing each memory access log entry and each performance log entry into a backing store.

* * * * *